United States Patent [19]

Mewes et al.

[11] Patent Number: 4,616,989
[45] Date of Patent: Oct. 14, 1986

[54] APPARATUS FOR THE INCORPORATION OF GLASS FIBERS INTO THERMOPLASTIC SYNTHETIC RESINS

[75] Inventors: Heinz Mewes, Troisdorf-Spich; Wilhelm Nachtigall, Troisdorf-Eschmar; Michael Wienand, deceased, late of Siegburg; by Anneliese Wienand, legal representative; by Hans-Jürg W. Wienand, heir, both of Siegburg; by Michael Wienand, heir, Krefeld; by Rudolf J. Wienand, heir; by Karl F. Wienand, heir, both of Siegburg; by Elisabeth H. M. Wienand, heir, Krefeld, all of Fed. Rep. of Germany

[73] Assignee: Dynamit Nobel Aktiengesellschaft, Troisdorf, Fed. Rep. of Germany

[21] Appl. No.: 411,998

[22] Filed: Aug. 27, 1982

Related U.S. Application Data

[63] Continuation of Ser. No. 877,805, Feb. 15, 1978, abandoned.

[30] Foreign Application Priority Data

Feb. 17, 1977 [DE] Fed. Rep. of Germany ....... 2706755

[51] Int. Cl.⁴ .............................. B29B 7/14; B29B 7/18
[52] U.S. Cl. ..................................... 425/203; 264/211; 264/349; 366/76; 366/83; 425/204; 425/205; 425/208; 425/DIG. 39
[58] Field of Search .............. 425/205, DIG. 39, 204, 425/203; 366/76, 83; 264/349, 211

[56] References Cited

U.S. PATENT DOCUMENTS

| 3,035,303 | 5/1962 | Stanley | 425/DIG. 39 |
|---|---|---|---|
| 3,304,282 | 2/1967 | Cadus et al. | 264/349 |
| 3,409,711 | 11/1968 | Pashak et al. | 264/349 |
| 3,632,254 | 1/1972 | Woodham | 425/205 |
| 3,746,489 | 7/1973 | Rizzi et al. | 425/205 |
| 3,981,840 | 9/1976 | Yamamoto et al. | 260/42 |
| 4,006,209 | 2/1977 | Chiselko et al. | 264/349 |
| 4,065,532 | 12/1977 | Wild et al. | 264/349 |

FOREIGN PATENT DOCUMENTS

| 74624 | 12/1970 | German Democratic Rep. | 425/205 |
|---|---|---|---|
| 1219946 | 1/1971 | United Kingdom | 425/349 |
| 1380082 | 1/1975 | United Kingdom | 425/205 |

Primary Examiner—James Derrington
Attorney, Agent, or Firm—Antonelli, Terry & Wands

[57] ABSTRACT

An improved process for incorporating glass fibers into a thermoplastic synthetic resin wherein the glass fibers are continuously mixed with a molten thermoplastic synthetic resin and the resulting mixture is shaped into a desired article, involves preheating the glass fibers to a temperature not more than the melting point of the synthetic resin, feeding the preheated glass fibers and the molten synthetic resin separately to a premixing chamber, intermixing the resin and fibers within the chamber and thereafter introducing the resultant premix continuously and directly into a two-stage degasifying screw-type extruder for effecting further homogenization of the premix and for extruding the desired article. The two-stage degasifying screw-type extruder used for carrying out this process is provided with a screw having a constant screw pitch in the two stages and in each stage with a low pressure zone and a high pressure zone in succession.

19 Claims, 4 Drawing Figures

APPARATUS FOR THE INCORPORATION OF GLASS FIBERS INTO THERMOPLASTIC SYNTHETIC RESINS

This is a continuation of application Ser. No. 877,805 filed Feb. 15, 1978 now abandoned.

The present invention relates to a process for the incorporation of glass fibers into thermoplastic synthetic resins, wherein the glass fibers are continuously mixed in with the molten thermoplastic synthetic resin, and this mixture is shaped into rods, sheets, or the like and optionally comminuted into granules, chips, or the like. The invention furthermore relates to an apparatus for conducting the process, operating with a two-stage degasifying screw-type extruder having an extrusion die arranged at the outlet.

DAS [German Published Application] No. 2,052,399 discloses, for example, an apparatus for the continuous production of glass-fiber-reinforced thermoplastic synthetic resins with a two-stage screw-type extruder wherein the extruder is fed with a non-plasticized mixture of granulated synthetic resin and chopped glass fibers. In this arrangement, the extruder takes over the function of plasticizing the premix and effecting the further mixing process.

In the manufacture of glass-fiber-reinforced thermoplastic synthetic resins, there recurs the problem of how to incorporate the glass fibers with maximum uniformity and also how to incorporate high proportions of glass fibers into the thermoplastic synthetic resin. There is also the desire for obtaining glass fibers of maximum length in the final product, i.e. to prevent the extensive comminution of the glass fibers during the incorporation phase. The aforedescribed problems have not been solved, either, to an optimum extent in the apparatus according to DAS No. 2,052,399 since, especially due to the plasticizing work to be effected by the degasifying screw extruders, a progressive comminution of the glass fibers occurs during the kneading of the mixture, unless very short glass fibers have been used initially for the production of the dry premix of glass fibers and granules.

The invention is based on the problem of conducting, during the manufacture of glass-fiber-reinforced synthetic resins, the incorporation of the glass fibers into the thermoplastic material with maximum gentleness, i.e. to avoid excessive fracturing of the glass fibers and simultaneously to reduce the mechanical wear on the mixing units involved, especially on account of friction with the glass fibers.

The process of this invention solves this problem by preheating the glass fibers to a temperature lying below the melting point of the synthetic resin or extending up to this melting point; then feeding the preheated glass fibers and the already melted synthetic resin separately to a premixing chamber and intermixing the resin and fibers therein; and thereafter introducing this premix continuously directly into a two-stage degasifying screw-type extruder for homogenizing purposes.

By separating the preparing of the thermoplastic synthetic resin melt and the incorporation of the glass fibers into this melt, on the one hand, and by dividing the incorporating step into a first premixing process and subsequent homogenizing process with a subsequent molding step, it is now possible to solve the posed problem with good results and to obtain relatively large lengths of, e.g. 0,4 to 0,8 mm, of glass fiber in the final product. As a consequence of the minor mechanical stress on the glass fibers in the final homogenizing step, the parts of the apparatus likewise show only minor signs of wear and tear. Moreover, due to the fact that the glass fibers are preheated, the thermoplastic synthetic resin melt is subjected to a lower thermal load; in particular, it is possible to maintain the melting temperature of the synthetic resin close to the lower limit, since hardly any heat is withdrawn from the melt by the glass fibers.

The apparatus for conducting the process likewise comprises a two-stage degasifying screw-type extruder with an extrusion die provided at the outlet. To attain the object of this invention, this apparatus is further enhanced, according to this invention, by a premixing dome or chamber having an inlet opening with a feeding means, connected upstream thereof, for the glass fibers, with an additional inlet opening with melting extruder, connected upstream thereof, for the thermoplastic synthetic resin, and with an outlet opening for the premix, followed by the opening of the degasifying screw-type extruder.

The premixing chamber takes over, in accordance with the invention, the task of loosening up the glass fibers and/or glass fiber bundles, and starts with the preliminary distribution of the glass fibers in the synthetic resin melt. Preferably, the premixing chamber is equipped with a mixing shaft studded with several rows of mixing pins and is additionally provided with heating means. Thus, a cooling and solidifying of the synthetic resin melt can be avoided and the loosening up and preliminary distribution of the glass fibers in the synthetic resin melt is made possible. Preferably, the synthetic resin melt is transferred from the melt extruder via the premixing chamber into the subsequent degasifying extruder under a slight superatmospheric pressure in the premixing chamber, thus ensuring the exclusion of oxygen and/or air.

A tamping conveyor screw is provided, for example, as the feeding means for the glass fibers. The glass fibers can be introduced into the tamping screw already in the preheated state and can then be continuously fed in uniform, metered amounts to the premixing chamber. Alternatively, the tamping screw proper can also be fashioned to be heatable with its housing and thus the heating of the glass fibers can be effected on their way through the tamping screw.

An advantageous embodiment of the apparatus of this invention provides that the mixing shaft of the premixing chamber is arranged as an extension of the screw shaft of the tamping screw and is fixedly joined to the screw shaft. In this way, only one drive mechanism for the tamping screw and the mixing shaft is necessary, for example.

Another advantageous construction of the premixing chamber resides in that a conveyor screw is provided for the mixing operation in the premixing chamber; the screw lands of the conveyor screw are provided with spaced-apart recesses and have outer diameters which are only a little smaller than the inner diameter of the premixing chamber.

Such a conveyor screw makes it possible for the mixture to flow back through the recesses in the lands as a supplemental action to the conveying effect, thus to obtain an improved mixing action.

The glass fiber-synthetic resin melt produced in the premixing chamber is homogenized in the subsequent process step in the directly adjoining degasifying screw-type extruder which is designed as a pure mixing and degasifying extruder. The apparatus is based on a two-stage degasifying extruder having an extrusion die at the outlet, wherein the screw of the degasifying extruder, with a constant pitch, is fashioned to be of two stages, with a low-pressure zone and a high-pressure zone being located in succession in each stage.

To perform the homogenizing work as intended by the present invention, this part of the apparatus is fashioned in accordance with the invention so that the ratio of the maximum value ($H_1$ or $H_2$, respectively) to the minimum value ($H_{11}$ or $H_{22}$, respectively) pertaining to the depth of the screw flights in the first stage corresponds to a compression ratio in the range of 2:1 to 6:1, preferably about 2:1 to 3:1 and in the second stage to a compression ratio in the range of 1.7:1 to 7:1, preferably about 1.7:1 to 2:1, and the ratio of the depth ($H_2$) of the screw flights in the conveying zone of the second stage to the depth ($H_1$) of the screw flights in the conveying zone of the first stage is in the range of 1.1:1 to 3.5:1, preferably about 1.1:1 to 2:1. This design of the screw of the degasifying extruder provides, in accordance with the invention, low shear and compression, and makes it possible to conduct a gentle homogenization of the glass fiber-synthetic resin melt mixture while avoiding excessive glass fiber breakage. In a further development of the apparatus of this invention, the screw of the extruder is equipped, in the low-pressure zone of the first stage, between the lands of the screw flights, with mixing pins, mixing cams, or the like preferably arranged in rows in a ring-shaped arrangement. This ensures, in the apparatus of this invention, that the glass fibers which are still present in the premix as glass fiber bundles are separated, and the glass fiber bundles proper are distributed, essentially in the first stage of the degasifying extruder. In detail, the first stage of the degasifying extruder is subdivided, for example, into a low-pressure zone with a subsequent compression zone, a high-pressure zone following thereafter, and a subsequent decompression zone; thereafter follows the second stage with a low-pressure zone with degasification, a compression zone, a high-pressure zone, and a transition zone to a mixing head.

After the degasification of the synthetic resin melt at the beginning of the second stage, the homogenization can be completed. In this connection, the screw mixing head arranged according to the invention at the outlet of the second stage of the screw and having a core diameter which is reduced as compared to the screw core diameter makes it possible to effect a final, intensive intermixing of synthetic resin melt and glass fiber and simultaneously serves to achieve temperature homogenization prior to entrance into the extrusion die. For this purpose, the screw mixing head can be provided, for example, with several annularly arranged rows of pins, cams, or the like, wherein the pins, cams, or the like are offset with gaps in between in the individual rows. Advantageously, a shear ring is formed between the rows of pins, cams, or the like at the screw mixing head, the outer diameter of this shear ring being larger than the core diameter of the mixing head, but smaller than the outer diameter of the pins, cams, or the like.

The process and apparatus of this invention are schematically illustrated in an embodiment in the drawings and will be explained in greater detail below with reference thereto, wherein in the drawings.

Figure 1:
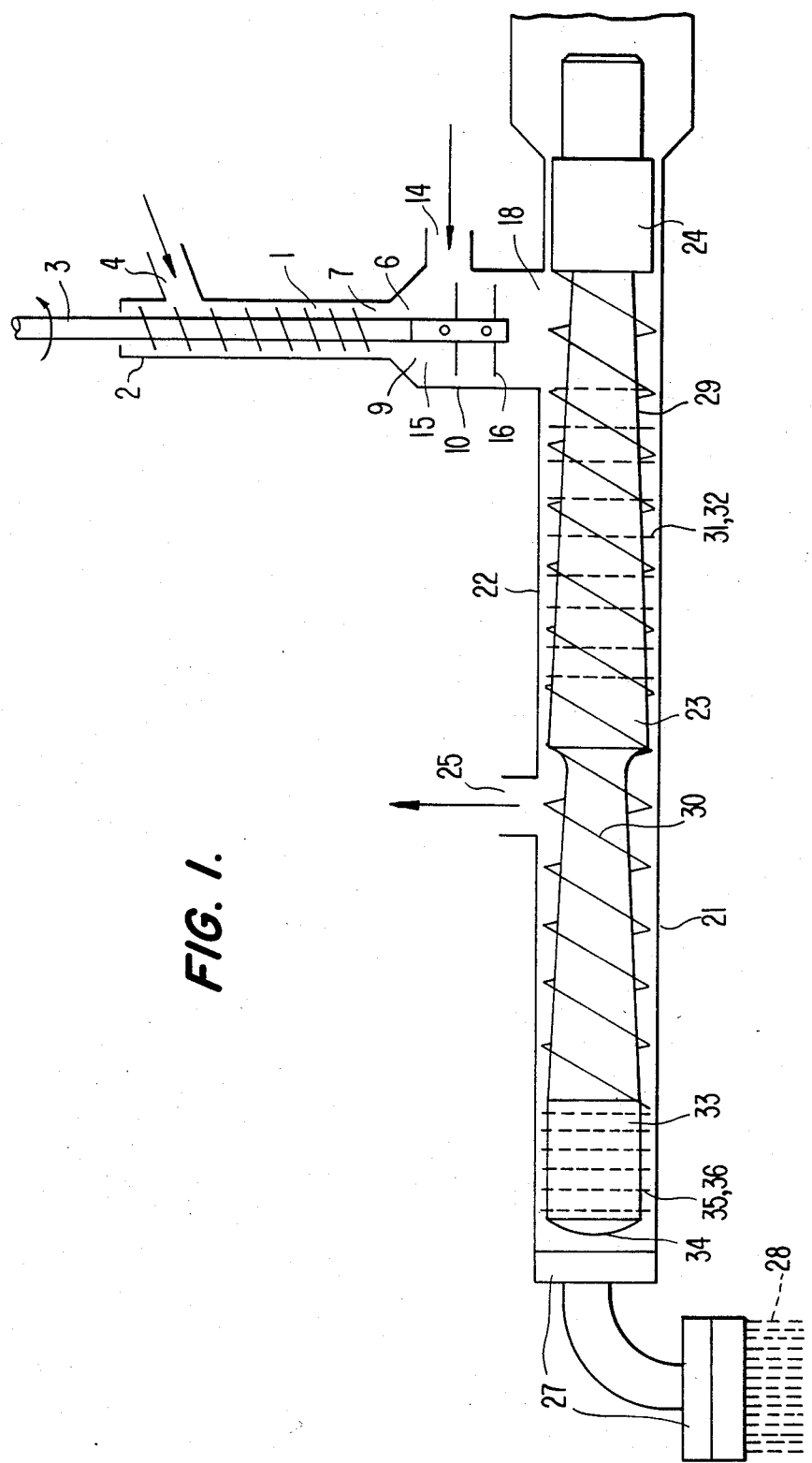
FIG. 1 shows a schematic view of the apparatus for mixing glass fibers into a thermoplastic synthetic resin.

FIG. 1 shows schematically the principle of this invention of mixing in glass fibers with a thermoplastic synthetic resin. Examples for suitable glass fibers are cut glass fibers adhering to each other as rovings and requiring an intensive loosening and distribution. Suitable thermoplastic synthetic resins are the conventional moldable thermoplastics, but especially in need of an intensive mixing procedure are thermoplastic synthetic resins such as polyolefins, polyethylene, polypropylene, polybutylene, thermoplastic polyesters, or the like. The glass-fiber-reinforced synthetic resins can be shaped directly to semifinished products, such as pipes, rods, panels, etc. However, it is also possible to obtain, from the initially formed products, granules, chips, etc. by a comminuting step, which may be subsequently subjected to further molding. In a first process step, the melting of the thermoplastic synthetic resin is carried out in a melting extruder, not shown, from which this melt is fed to the premixing chamber 9 through the inlet port 14. At the same time, the preheated glass fibers are continuously added in metered amounts through the inlet port 19 of the premixing chamber into the chamber. To avoid overheating of the thermoplastic synthetic resin melt in the melting extruder and thus to preclude thermal damage to the resin, the glass fibers are fed to the premixing chamber in a preheated state, for example, preheated to about 150° C. This preheating step can be effected, for example, by way of infrared radiators traversed by a conveyor belt laden with glass fibers. The thus already preheated glass fibers can then be fed to the premixing chamber via the feeding means which are fashioned, for example, as a tamping screw 1. The tamping screw 1 comprises the tamping screw barrel 2 in which the shaft of the tamping screw, denoted by 3, is guided. The glass fibers are fed to the tamping screw via the inlet port 4 and directly introduced into the premixing chamber via the outlet port 7. If the glass fibers were to be fed into the synthetic resin melt in the cold state, this would mean, especially in case of thermoplastic synthetic resins having a pronounced melting point, that the melt would have to be maintained at a correspondingly higher temperature to avoid melt solidification. However, this is undesirable to avoid thermal damage. In the premixing chamber, the mixing shaft 15 is arranged, studded with the mixing pins 16. The premixing chamber 9 is directly in open communication, with its outlet 18, with the feed opening 26 of the degasifying extruder 21. The glass fiber-synthetic resin melt premix is thus introduced from the premixing chamber 9 directly into the degasifying extruder 21. The extruder 21 is designed purely as a mixing and degasifying extruder and is to effect the complete loosening up of the glass fiber bundles and the uniform distribution thereof in the synthetic resin melt. The degasifying extruder 21 is equipped with a screw barrel or cylindrical housing 22 in which the screw 23 is supported at the end 24. The screw 23 is constructed of two stages. At the beginning of the second stage, the degasifying opening 25 is arranged in the housing 22 to remove by suction the volatile components liberated from the synthetic resin melt. At the front end 34 of the screw follows the extrusion die 27, which is designed in the illustrated embodiment as an angle head, for example. The extrusion die 27 is provided, for example, with a plurality of apertures from which individual skeins or filaments 28 of the glass-fiber-reinforced synthetic resin are discharged and are cooled, for instance, in a subsequent water bath, not shown, and then granulated.

In correspondence with the varying compression zones, the screw core diameter 29 of the screw 23 varies with a preferably constant screw pitch. To improve the mixing and distributing effect, the screw 23 of this invention is provided in the first stage additionally with mixing pins 31, arranged in rows 32, between the screw flights 30, and in the zone of the tip of the screw, a mixing head 33 is arranged with mixing pins 36, likewise disposed in rows 35.

Figure 2:
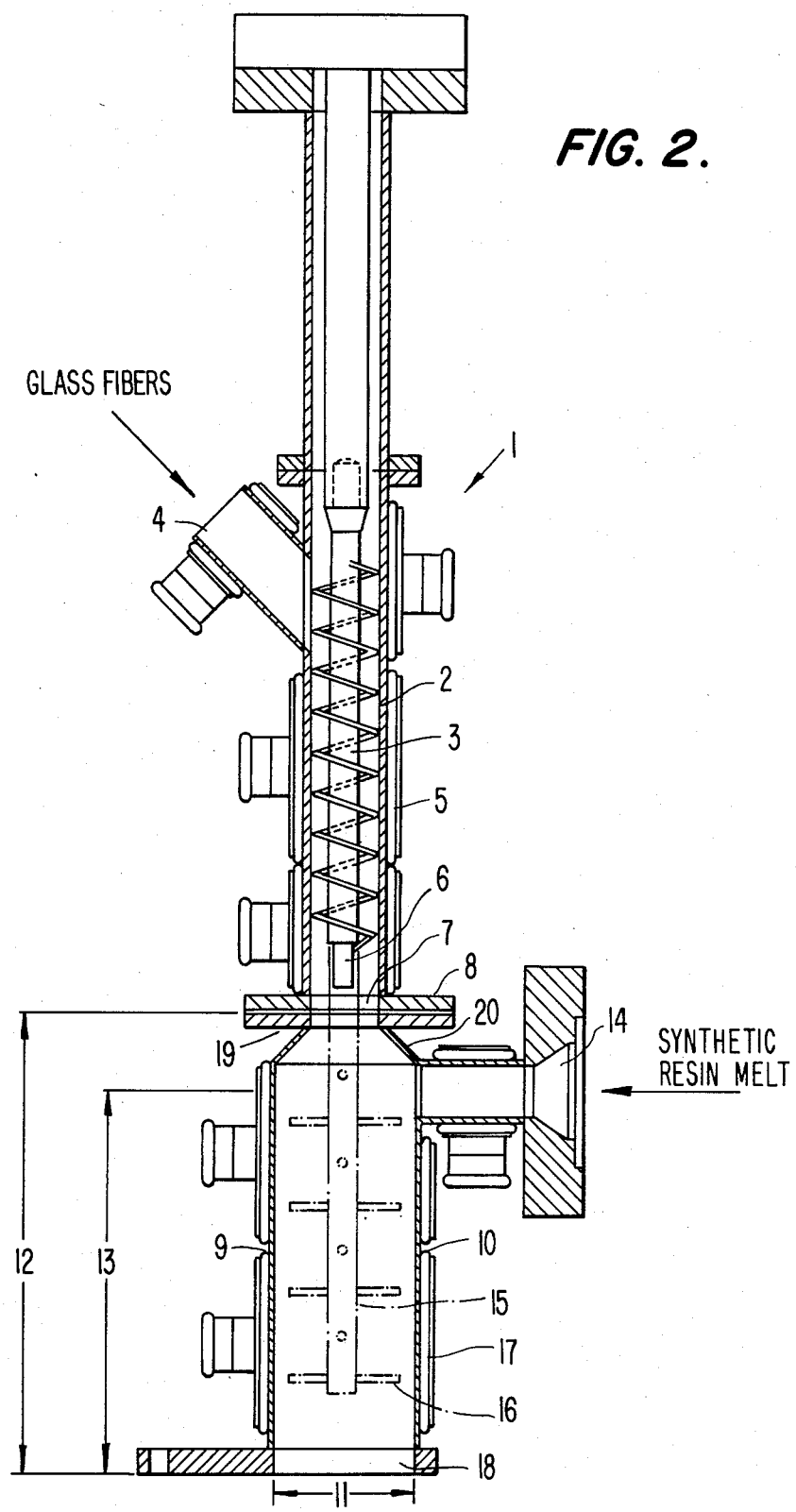
FIG. 2 shows the apparatus for premixing the glass fibers and the synthetic resin melt, in a sectional view.

FIG. 2 shows in a more elaborate schematic cross-sectional view the device for preparing the premix of glass fibers and thermoplastic synthetic resin in greater detail. To obtain a continuous mode of operation, it is necessary to convey the glass fibers as well as the synthetic resin melt in a continuous process and to feed these materials to the degasifying screw-type extruder in metered amounts. This continuous transportation of the glass fibers is effected, for example, by means of the tamping screw 1. The tamping screw shaft 3 is arranged in the tamping screw barrel 2, which can be heated, for example, with the heater 5 disposed on the outside. The glass fibers are introduced into the tamping screw 1 through the inlet port 4; in this connection, it is advantageous to preheat the glass fibers already prior to their introduction into the tamping screw, for example, by means of infrared radiators. The glass fibers are advantageously heated to a temperature lying somewhat below the melting temperature of the synthetic resin, for example to about 150°-200° C. However, since the tamping screw also has the effect that the glass fibers, normally introduced in the form of glass fiber bunches, are still further compressed, the subsequent loosening and preliminary distribution of the glass fibers in the subsequent premixing chamber 9 is of special importance. The tamping screw 1 is flanged with its housing via the flanges 8 to the premixing dome or chamber 9, for example, to the conically shaped upper end 20 thereof. Advantageously, the mixing shaft 15 of the premixing chamber 9 is arranged in the axial extension of the tamping screw shaft 3 and is fixedly joined to the tip 6 of the tamping screw shaft 3. The drive mechanism, not shown, of the tamping screw shaft 3 thus also constitutes simultaneously the drive mechanism for the mixing shaft 15. The mixing shaft 15 is equipped with mixing pins 16, agitator arms, or the like, preferably arranged in several rows above one another in an offset arrangement. The size of the premixing chamber depends on the efficiency of the degasifying extruder, the mixing shaft being equipped with four to twelve, preferably six to eight rows of pins, there being two to four, preferably two mixing pins 16 per row of pins. The total length 12 of the premixing chamber, the height 13 at which the feed means 14 of the synthetic resin melt is provided, and the diameter 11 of the premixing chamber are dependent, as mentioned above, on the efficiency and size of the degasifying extruder. The premixing chamber 9 is fed with synthetic resin melt preferably so that there is a minor superatmospheric pressure in the premixing chamber as compared to the degasifying extruder, so that the exclusion of oxygen is ensured during the transfer of the synthetic resin melt from the melting extruder into the degasifying extruder. Moreover, the premixing chamber 9 and/or its housing 10 can be equipped on the outside with a heating unit 17 to ensure a uniform temperature of the premix.

Figure 3:
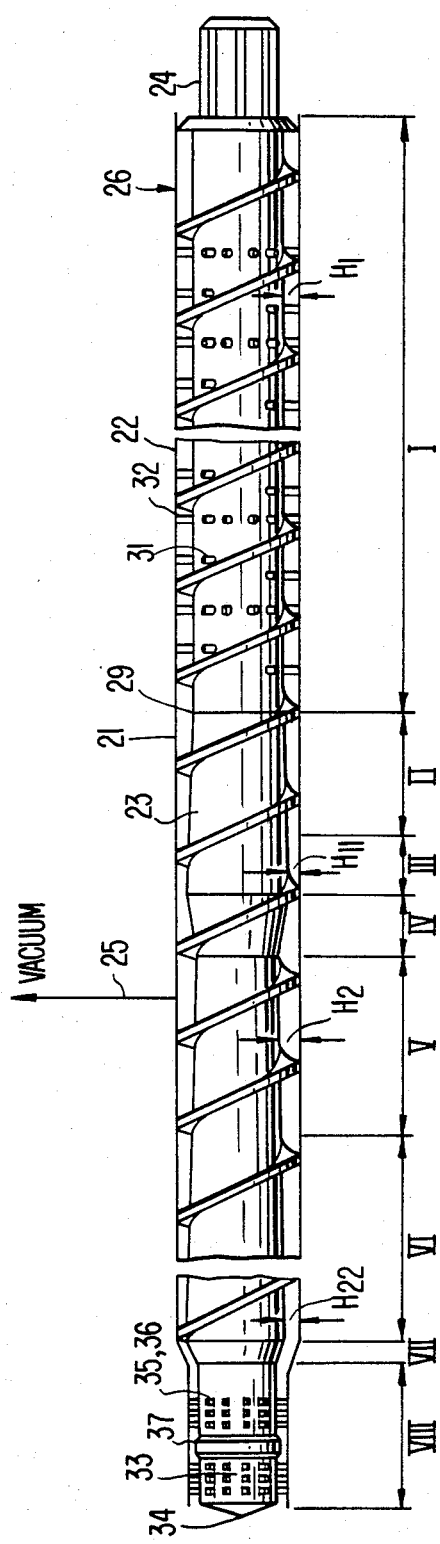
FIG. 3 is a schematic view of the structure of the screw pertaining to the degasifying screw-type extruder.

FIG. 3 shows the degasifying screw-type extruder 21 in a schematic view with the housing 22 and the screw 23, as well as the individual screw zones I–VIII. The extruder 21 is fashioned in two stages; at the beginning of the first stage, there is the feed opening 26 for the premix of glass fibers and synthetic resin melt, and at the beginning of the second stage, there is the degasifying outlet aperture 25. The first stage comprises three screw zones and a transition zone to the second stage, and the latter, in turn, comprises four screw zones. With constant screw pitch, a low-pressure zone and a high-pressure zone follow each other in each stage. The compression ratios and the configuration of the screw are predetermined so that the operation is conducted at relatively low compression, and accordingly the mixing and homogenizing functions can be fully executed. The compression ratio in the first stage from the maximum value $H_1$ of the depth of the screw flight to the minimum value $H_{11}$ is in the range of about 2:1 to 6:1, preferably 2.5:1. In the second stage, the ratio from the maximum value $H_2$ of the depth of the screw flight to the minimum value $H_{22}$ corresponds to a compression ratio in the range of about 1.7:1 to 7:1, preferably 1.9:1. In this connection, the ratio of the depth $H_2$ of the screw flights in the conveying zone of the second stage to the depth $H_1$ of the screw flights in the conveying zone of the first stage is in the range of about 1.1:1 to 3.5:1, preferably 1.15:1. The functions of the successive screw zones I–VIII will be set forth below:

Zone I

This section, designated as the conveying or feed zone or also the low-pressure zone of the first stage of the degasifying extruder 21 serves for the intensive further incorporation of the glass fibers into the synthetic resin melt. During this incorporating step, a uniform distribution of the glass fiber bundles within the synthetic resin melt is likewise accomplished, and the glass fiber bundles are furthermore divided into individual fibers. This zone is also called the homogenizing zone and has a constant core diameter. To promote the above-mentioned homogenization, radial rows of mixing pins are provided between the screw flights.

Zone II

The zone, denoted as the compression zone, serves for building up the pressure in the melt upstream of the vacuum zone of the second stage. The core diameter of the screw here rises gradually.

Zone III

This zone forms the transition to the subsequent zone and constitutes the end of the compression zone with a constant core diameter of the screw.

Zone IV

This zone, called the decompression zone, serves for reducing the pressure in the melt before it enters the vacuum zone, i.e. the feed zone of the second stage. In this area, the core diameter of the screw decreases until it reaches the core diameter of the vacuum zone.

Zone V

This zone, called the vacuum zone and simultaneously forming the feed zone of the second stage of the degasifying extruder, serves to degasify the melt. This zone has a constant core diameter of the screw.

Zone VI

This zone forms the compression zone of the second stage with an increasing screw core diameter and serves for the further homogenization of the melt and for the further distribution of the glass fibers in the melt.

Zone VII

This zone again forms a transition zone between the compression zone VI and the subsequent final zone VIII of the screw, fashioned as a mixing head. This zone exhibits a decreasing screw core diameter.

Zone VIII

The screw tip at the end of the second stage of the screw of the degasifying extruder is fashioned as a mixing head for the final, intensive intermixing of the glass fiber-synthetic resin melt and serves at the same time to render the temperature uniform prior to entrance into the subsequent extrusion die. The core diameter is smaller than in the preceding area of the compression zone of the screw; mixing pins in rows are located on the core, wherein the rows are preferably arranged at mutual spacings in an offset pattern. A further modification can be imparted to the mixing head by equipping same with a shear ring.

The following description relates to preferred dimensions of the screw, the so-called screw geometry of the degasifying extruder, wherein the reference symbol D constitutes in each case the barrel diameter or the inner housing diameter of the screw "The clearance provided between the outermost edge of housing 22. the screw flight and the inner wall of the screw housing measures about 0,2 mm."

|  | From–To | Preferably |
|---|---|---|
| Zone I: Homogenizing zone | | |
| Length | 8D–12D | 10D |
| Core diameter | 0.7D–0.9D | 0.8D |
| Screw pitch | 0.8D–1.2D | 1.0D |
| Number of mixing pin rows between the lands of a screw flight | 2–4 | 3 |
| Number of pins per row | 5–12 | 7 |
| Pin diameter | 0.05D–0.1D | 0.07D |
| Pin length | 0.08D–0.09D | 0.09D |
| Zone II: Compression zone | | |
| Length | 1D–4D | 2D |
| Core diameter increasing to: | 0.85D–0.95D | 0.92D |
| Screw pitch | 0.8D–1.2D | 1.0D |
| Zone III: Transition zone | | |
| Length | 0.5D–3D | 1.0D |
| Core diameter | 0.85D–0.95D | 0.92D |
| Screw pitch | 0.8D–1.2D | 1.0D |
| Zone IV: Decompression zone | | |
| Length | 0.5D–3.0D | 1.0D |
| Core diameter decreasing to: | 0.65D–0.80D | 0.77D |
| Screw pitch | 0.8D–1.2D | 1.0D |
| Zone V: Vacuum zone | | |
| Length | 2D–4D | 3D |
| Core diameter | 0.65D–0.80D | 0.77D |
| Screw pitch | 0.8D–1.2D | 1.0D |
| Zone VI: Compression zone | | |
| Length | 5D–8D | 6D |
| Core diameter increasing to: | 0.80D–0.95D | 0.88D |
| Screw pitch | 0.8D–1.2D | 1.0D |
| Zone VII: Transition zone | | |
| Length | 0.1D–0.3D | 0.15D |
| Core diameter decreasing to: | 0.5D–0.8D | 0.73D |
| Screw pitch | 0.8D–1.2D | 1.0D |
| Zone VIII: Mixing head | | |
| Length | 1.5D–3.0D | 2.0D |
| Core diameter | 0.65D–0.80D | 0.73D |
| Number of rows of mixing pins | 4–10 | 6 |
| Number of pins per row | 8–14 | 12 |
| Pin diameter | 0.5D–0.1D | 0.07D |
| Pin length | 0.04D–0.06D | 0.06D |
| Shear ring length | 0.1D–0.3D | 0.23D |
| Shear ring diameter | 0.85D–0.80D | 0.80D |

Figure 4:
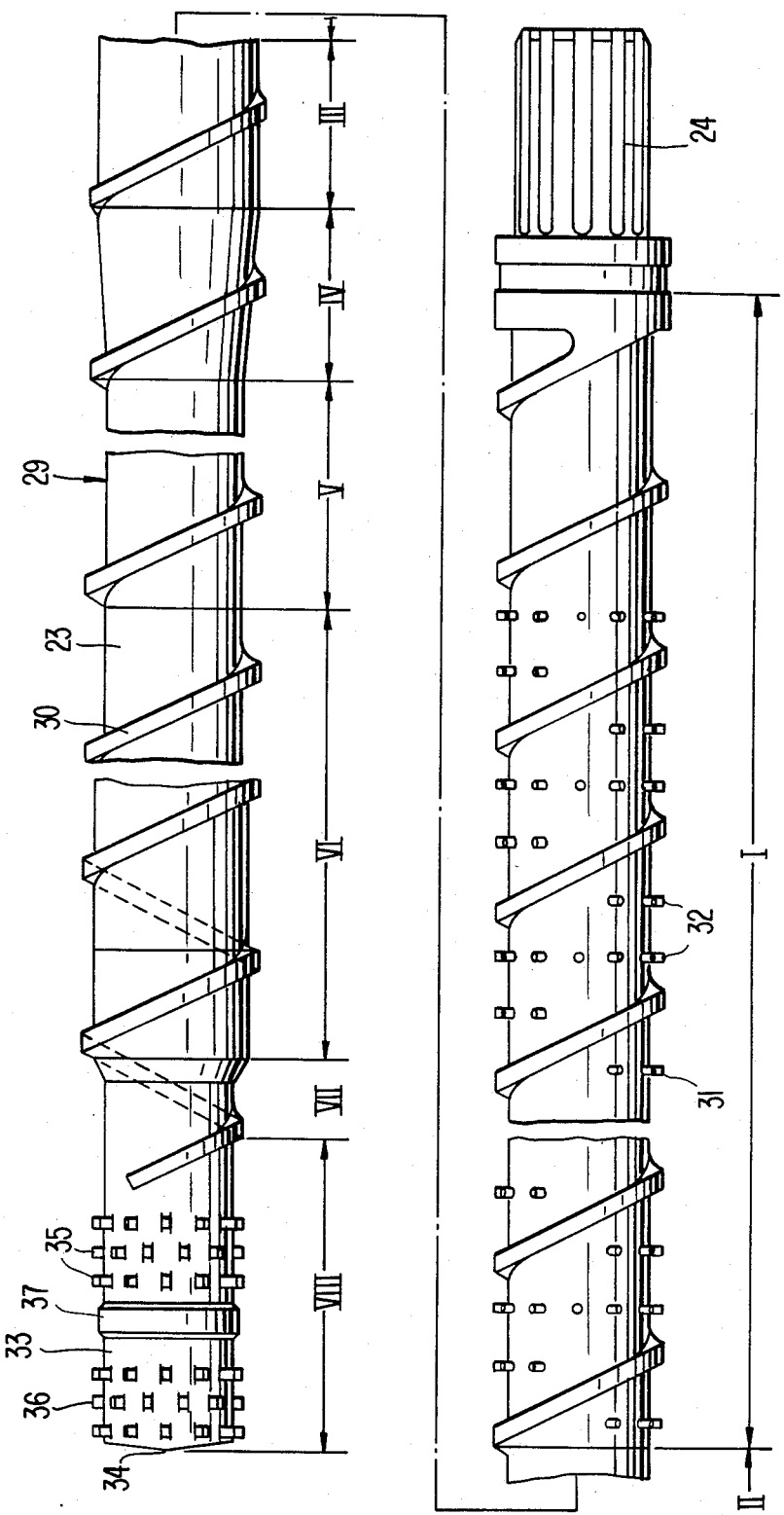
FIG. 4 shows, in a plan view, additional details of the screw according to FIG. 3.

FIG. 4 shows additional details of the construction of screw 23 pertaining to the degasifying screw-type extruder, as described in FIGS. 1 and 3. In particular, the configuration of the conveying zone I of the first stage in form of a homogenizing stage, with the mixing pins 31, arranged in rows 32, between the individual lands of the screw flights 30 can clearly be seen from this illustration. Preferably, the pins 31 are arranged so that they have respectively identical mutual spacings and, as seen in the axial direction, all pins are disposed one behind the other in one direction. In the illustrated example according to FIG. 4, respectively, three rows 32 of pins are provided between the individual screw flights. Merely in the direct feed range of the glass fiber-synthetic resin melt from the premixing dome, there are no pins 31. In the embodiment shown herein, the zone VIII is fashioned as a mixing head so that additionally a shear ring 37 is provided between respectively three rows 35 with pins 36. In the illustrated example, the pins 36 of the second and fifth rows as counted from the tip 34 of the screw are disposed in each case exactly between the pins of the first, second, fourth, and sixth rows, i.e. they are gapped. The screw pitch is constant for the entire two-stage screw, which is done especially for machining and manufacturing reasons.

The process according to the invention with the associated apparatus makes it possible to effect a gentle mixing of glass fibers into a thermoplastic synthetic resin melt; in this connection a uniform distribution of the glass fibers is possible even in case of high weight proportions of glass fibers amounting to 30% by weight and thereabove, based on the glass-fiber-containing synthetic resin. As contrasted to the conventional processes and devices, glass fiber fractures are extensively avoided, so that the directly extruded product has glass fiber lengths which are greater than those obtained by means of the known methods. This is made possible due to the low mechanical stress exerted on the glass fibers while being processed by the degasifying screw-type extruder equipped in accordance with the invention to serve as a homogenizer. However, at the same time, a low amount of mechanical wear and tear on the screw and the screw barrel of the degasifying extruder has likewise been ensured. The step of preheating the glass fibers makes it possible to reduce the melting temperature of the thermoplastic synthetic resin and thus provides a gentle treatment of and a lower thermal load on the synthetic resin. At the same time, an accurate temperature control with only minor fluctuations has been made possible during the entire course of the process. For example, it is possible by means of an apparatus having the dimensions indicated in the example to incorporate glass fibers into a polytetramethylene terephthalate melt, thus obtaining in the thus-produced glass-fiber-reinforced polytetramethylene terephthalate granules glass fiber lengths which are, on the average, between 400 and 1,200μ, "preferable between 400 and 1200μ. The distribution of the glass fibers in the thermoplastic synthetic resin melt and the homogenization causes breakage of the glass fibers. The depth of the screw flights influences directly the more or less breaking of the glass fibers. According to the invention the main part of the glass fibers 60 to 70% obtain a length between 400 and 800μ."

The following example further provides an understanding of the operation of the process and apparatus of this invention. In this example, glass fibers having a length of from 3 to 10 mm and a diameter of 0,01 mm were incorporated into a polytetramethylene phthalate melt to provide an extruded mass which subsequently was formed into granules having dimensions of 3 to 5 mm length, height, width and containing glass fibers with lengths on the average between 400 and 800μ. In carrying out this example, an apparatus of the type illustrated in FIG. 1 was employed, the apparatus having a barrel diameter of 150 mm and the preferred dimensions of the screw set forth hereinabove. In this operation, the glass fibers at a rate of 90 kg/hr. were introduced into the inlet port of the premixing chamber and at the same time 210 kg/hr. of the polytetramethylene phthalate melt was introduced into the premixing chamber. The glass fibers prior to being introduced of 100° C. and the melt heated to 245° C.

After a residence time of 20 sec. in the premixing chamber, the resultant admixture of glass fibers and resin melt was introduced into the degasifying screw-type extruder.

After a total residence time of 6 minutes in the extruder, a product consisting of resin melt containing homogenously distributed glass fibers with an average length between 400 and 800μ was extruded through the extruder die at the outlet end of the extruder at a rate of 300 kg/hr.

During processing the admixture of glass fibers and melt resin was maintained at a temperature from 240° to 250° C. within the two-stage extruder.

What is claimed is:

1. An apparatus for incorporating glass fibers into a molten thermoplastic synthetic resin which comprises a two-stage degasifying screw-type extruder having an inlet for entry of a premix of preheated glass fiber and molten thermoplastic synthetic resin and an extrusion die at an outlet end thereof for extruding a mixture of said glass fibers and said molten thermoplastic synthetic resin, means for preheating glass fibers to a temperature from 60° to 120° C. below the melting point of the thermoplastic synthetic resin up to the melting point of the synthetic resin, a melt extruder for extruding molten thermoplastic synthetic resin, a premixing chamber provided with one inlet port for entry of the preheated glass fibers, with another inlet port for separate entry of the molten thermoplastic synthetic resin and with an outlet port for discharging a premix of glass fibers and molten thermoplastic synthetic resin, and feeding means for introducing the preheated glass fibers in metered amounts into the inlet port of said premixing chamber; said outlet port of said premixing chamber being directly connected to said inlet of the degasifying extruder to discharge the premix of glass fibers and molten thermoplastic synthetic resin directly into said degasifying screw-type extruder.

2. An apparatus according to claim 1, wherein said feeding means for introducing the glass fibers into said premixing chamber comprises a screw conveyor having a shaft extending from an inlet for entry of the preheated glass fibers to the inlet port of said premixing chamber and the premixing chamber further includes a mixing shaft equipped with several rows of mixing pins which is an axial extension of the conveyor screw of said feed means.

3. An apparatus according to claim 1, wherein for mixing purposes, a conveying screw is provided in the premixing chamber, the screw flights of this screw being provided with spaced-apart recesses, and the outer diameter of this screw being only a little smaller than the inner diameter of the premixing chamber.

4. An apparatus according to claim 1, wherein the premixing chamber is provided with means for heating the contents of said chamber.

5. An apparatus according to claim 2, wherein the premixing chamber is provided with means for heating the contents of said chamber.

6. An apparatus according to claim 3, wherein the premixing chamber is provided with means for heating the contents of said chamber.

7. An apparatus according to claim 1, wherein the feeding means for the glass fibers is a heatable tamping screw.

8. An apparatus according to claim 2, wherein the feeding means for the glass fibers is a heatable tamping screw.

9. An apparatus according to claim 3, wherein the feeding means for the glass fibers is a heatable tamping screw.

10. An apparatus according to claim 7, wherein the mixing shaft in the preheating chamber is arranged in an extension of the screw shaft of the tamping screw and is fixedly connected with said screw shaft.

11. An apparatus according to claim 1, wherein said two-stage degasifying screw-type extruder comprises an extrusion die arranged at the outlet thereof for extruding a mixture of fibers and resin which has a screw fashioned with a constant screw pitch in two stages, wherein in each stage a low-pressure zone and a high-pressure zone are provided in succession, and the ratio (1) of the maximum value ($H_1$) to the minimum value ($H_{11}$) of the depth of the screw flights in the first stage corresponds to a compression ratio in the range of 2:1 to 6:1, and in the second stage the ratio (2) of the maximum value ($H_2$) to the minimum value ($H_{22}$) of the depth of the screw flights corresponds to a compression ratio in the range of 1.7:1 to 7:1, and the ratio (3) of the depth ($H_2$) of the screw flights in the feed zone of the second stage to the depth ($H_2$) of the screw flights in the feed zone of the second stage to the depth ($H_1$) of the screw flights in the feed zone of the first stage is in the range of 1.1:1 to 3.5:1.

12. The apparatus according to claim 11, wherein the ratio (1) corresponds to a compression ratio in the range of from 2:1 to 3:1, ratio (2) corresponds to a compression ratio is in a range of from 1.7:1 to 2:1 and the ratio (3) is in the range of from 1.1:1 to 2:1.

13. An apparatus according to claim 11, wherein the screw at the outlet of the second stage is formed with a screw mixing head having a core diameter which is reduced as compared with the screw core diameter.

14. An apparatus according to claim 13, wherein the screw mixing head is equipped with several annularly arranged rows of mixing elements, wherein the pins of the individual rows are offset with respect to one another in a gapped arrangement.

15. An apparatus according to claim 14, wherein a shear ring is provided between the rows of mixing elements, the outer diameter of which is larger than the core diameter of the mixing head, but smaller than the outer diameter of the mixing elements.

16. An apparatus according to claim 15, wherein the screw in the low-pressure zone of the first stage is equipped, between the lands of the screw flights, with mixing elements arranged preferably in a ring shape and in rows.

17. An apparatus according to claim 16, wherein the first stage of the degasifying extruder is subdivided into a low-pressure zone with a subsequent compression zone, a subsequent high-pressure zone, and a decompression zone, followed by the second stage comprising a low-pressure zone with degasification, a compression zone, a high-pressure zone, and a transition zone to the mixing head.

18. An apparatus according to claim 1, wherein said premixing chamber has rotating means for mixing the glass fibers together with said molten thermoplastic synthetic resin.

19. An apparatus according to claim 1, wherein the outlet port of the premixing chamber is arranged above the degasifying extruder so that the premix of glass fibers and molten thermoplastic synthetic resin is fed downwardly into the degasifying extruder with the aid of gravity.

* * * * *